United States Patent [19]

Hendry

[11] Patent Number: 5,518,386
[45] Date of Patent: May 21, 1996

[54] SYSTEM FOR INJECTION MOLDING UTILIZING A PRESSURIZING FLUID SOURCE WITHIN A CHAMBER IN THE MOLD

[75] Inventor: James W. Hendry, Brooksville, Fla.

[73] Assignee: Melea Limited, Southfield, Mich.

[21] Appl. No.: 886,374

[22] Filed: May 20, 1992

Related U.S. Application Data

[60] Division of Ser. No. 699,151, May 13, 1991, Pat. No. 5,137,680, and a continuation-in-part of Ser. No. 674,997, Mar. 28, 1991, abandoned, which is a continuation-in-part of Ser. No. 552,909, Jul. 16, 1990, Pat. No. 5,114,660.

[51] Int. Cl.⁶ .................................................. B29C 45/16
[52] U.S. Cl. ............................ 425/130; 264/572; 425/564
[58] Field of Search ............................ 364/572; 425/130, 425/564

[56] References Cited

U.S. PATENT DOCUMENTS

| | | | |
|---|---|---|---|
| 4,101,617 | 7/1978 | Friederich | 264/93 |
| 4,855,094 | 8/1989 | Hendry | 264/572 |
| 4,935,191 | 6/1990 | Baxi | 264/572 |
| 4,943,407 | 7/1990 | Hendry | 264/572 |
| 4,948,547 | 8/1990 | Hendry | 264/500 |
| 5,030,076 | 7/1991 | Ebenhofer et al. | 264/572 |
| 5,066,214 | 11/1991 | Baxi et al. | 264/572 |

*Primary Examiner*—Tim Heitbrink
*Attorney, Agent, or Firm*—Brooks & Kushman

[57] ABSTRACT

A method and system for the injection molding of plastic articles in an injection molding system including a chamber in a mold of the system which stores a charge of pressurized gas immediately prior to use. The mold has an injection aperture and a mold cavity for receiving molten resin. A resin flow path fluidly communicates the injection aperture and the mold cavity within the mold. An orifice in the mold opens the chamber to the mold. A gas receiver initially stores the charge of pressurized gas and a fluid circuit selectively introduces the charge of pressurized fluid into the chamber. A valve mechanism in the chamber selectively fluidly communicates the chamber to the flow path under control of a controller. When communicated to the flow path, the charge of gas distributes the molten plastic within the mold cavity in one embodiment of the invention.

14 Claims, 2 Drawing Sheets

5,518,386

SYSTEM FOR INJECTION MOLDING UTILIZING A PRESSURIZING FLUID SOURCE WITHIN A CHAMBER IN THE MOLD

Cross-Reference To Related Applications

This is a divisional of copending application(s) Ser. No. 07/699,151 filed on May 13, 1991, now U.S. Pat. No. 5,137,680 and a C-I-P application of U.S. Ser. No. 674,997 filed Mar. 28, 1991 entitled "Method and System for the Injection Molding of Plastic Articles Utilizing a Fluid Compression Unit" abandoned, which, in turn is a C-I-P application of U.S. Ser. No. 552,909, filed Jul. 16, 1990 entitled "Method and System for the injection Molding of Plastic Articles Utilizing a Fluid Compression Unit" now U.S. Pat. No. 5,114,660, both of which are incorporated herein by reference.

TECHNICAL FIELD

This application relates to method and systems for injection molding of plastic articles using fluid pressure and, in particular, to method and systems for the injection molding of plastic articles using fluid pressure to assist in the making of plastic articles.

BACKGROUND ART

It is known in the plastic molding art to use pressurized fluid in conjunction with the plastic molding of articles, as disclosed in the Friederich U.S. Pat. No. 4,101,617.

Gas-assisted injection molding is a thermo-plastic molding process which provides stress-free large parts with a class A surface and virtually no sink marks. Gas-assisted injection molding is a low-pressure molding process compared to conventional injection molding. In this process, inert gas is injected into the plastic after it enters the mold. The gas does not mix with the plastic but remains in the middle of the thicker sections of the molding. By controlling the gas pressure, the quantity of plastic injected into the mold (short shot) and the rate of gas flow, a predetermined network of hollow interconnecting channels is formed within the molded part. The gas pressure remains constant in the network of hollow channels throughout the molding. This compensates for the tendency of the plastic to shrink at the thicker areas of the molding, preventing warpage and reducing stress. The gas pressure is relieved just prior to opening the mold. Because of the relatively low injection pressure, large parts can be molded with substantial reductions in clamp tonnage.

The gas system equipment provides the precise control of pressure, timing and volume of gas which is injected into the part, all of which are important to the control of the gas-assisted injection process.

In U.S. Pat. No. 4,948,547 entitled "Improved Method for the Use of Gas Assistance in the Molding of Thermoplastic Articles," assigned to the Assignee of the present invention, a method of gas-assisted injection molding is disclosed in which a charge of pressurized gas is injected into the mold but not into the article-defining cavity. The gas charge is of a predetermined quantity and pressure, sufficient to assist in filling out the article defining cavity with resin and promoting surface quality.

U.S. Pat. No. 4,935,191 discloses a process for producing an injection molded product including introducing a stream of plastic material into a mold space at a first pressure. A quantity of gas is stored in a storage chamber at a second pressure which is at least as high as the first pressure. The gas is introduced into the molten stream of plastic material immediately after the molten material has passed the position at which the gas is introduced, thereby forming a gas cavity in the molten material.

The mechanism for charging a pressurized fluid or gas for use in a molding process is described in detail in U.S. Pat. No. 4,855,094. Also, a detailed description of various mechanisms for introducing the pressurized gas into the mold is described in this patent which is assigned to the Assignee of the present application. One mechanism is a sliding needle valve located in a sprue bushing. In an open position of the needle valve, gas is injected through a port.

One limitation of the prior art is that a charge of pressurized gas is stored some distance from the mold and, consequently, there are pressure drops as the gas travels to the mold. Repressurization must then occur. Another limitation of the prior art is that unless some mechanical mechanism is provided, the pressurized gas must have a pressure less than the pressure of the molten plastic in the mold.

SUMMARY OF THE INVENTION

An object of the present invention is to provide a method and system for the injection molding of plastic articles wherein a charge of pressurized fluid can be stored in the mold and have a pressure higher than the pressure of the molten plastic in the mold.

Another object of the present invention is to provide a method and system for the injection molding of plastic articles wherein a movable valve mechanism forms a depression in the molten plastic in the mold which helps to direct the flow of pressurized fluid allowed to flow upon movement of the valve mechanism.

Yet still another object of the present invention is to provide a method and system for the injection molding of plastic articles wherein a charge of pressurized fluid is available immediately adjacent the molten plastic in the mold during the injection molding process.

In carrying out the above objects and other objects of the present invention, a method for the injection molding of plastic articles in an injection molding system is provided. The injection molding system includes a mold having an injection aperture and a mold cavity for receiving molten resin. The method includes the step of injecting a quantity of molten plastic through the injection aperture and into the mold cavity. A resin flow path fluidly communicates the injection aperture and the mold cavity within the mold. The method also includes the step of communicating a charge of pressurized fluid from a source of pressurized fluid to a chamber within the old, an orifice opening from the chamber to the flow path, and blocking the orifice so that the charge of pressurized fluid is stored within the chamber. The method further includes the steps of unblocking the orifice so that the stored charge of pressurized fluid is introduced into the flow path from the orifice, containing the fluid under pressure within the mold until the article is set up and formed in the mold cavity, and venting the fluid from the mold.

Further in carrying out the above objects and other objects of the present invention, an injection molding system for the injection molding of plastic articles is provided. The system includes a mold having a resin injection aperture and a mold cavity for receiving molten plastic. The system further includes a resin flow path fluidly communicating the injection aperture and the mold cavity with the mold, a chamber and an orifice opening from the chamber to the flow path. Fluid receiver means stores a charge of pressurized fluid. Fluid circuit means interconnects the fluid receiver means to the chamber for selectively introducing the charge of pressurized fluid into the chamber. Valve means selectively fluidly communicates the chamber to the flow path. Control means connected to the valve means and controlling operation thereof causes the valve means to initially store the charge of pressurized fluid in the chamber and then causes the valve means to communicate the chamber to the flow path to allow the charge into the flow path.

Preferably, the mold includes valve means having a piston and a tip portion operatively associated with the piston to move therewith within the chamber. The tip portion has a closed position and an open position to introduce the charge of pressurized fluid from the chamber, through the orifice and into the flow path. The stored charge applies a pressure to the piston to urge the tip portion toward its open position.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

General Method Of Operation

In overview, the method provides for molding of plastic articles with hollow interior sections where pressurized fluid is present in formation of the article in the mold cavity. The presence of the pressurized fluid creates an outward pressure which minimizes sink marks and reduces the material requirements and weight of the molded article. However, it is to be understood that the method is capable of providing for the molding of plastic articles with solid interior where pressurized fluid is injected into the mold but not into the article-defining cavity. The gas charge is of predetermined quantity and pressure sufficient to assist in filling out the article-defining cavity with resin and promoting surface quality as described in greater detail in U.S. Pat. No. 4,948,547, entitled "Method for the Use of Gas Assistance in the Molding of Plastic Articles".

As disclosed in the above-noted patent applications, a charge of pressurized fluid is stored within a fluid receiver means or mechanism 10 at a level within a predetermined range of pressures such as 14,000 psi. This pressure may be reduced to the pressure required by the injection molding process such as by a gas regulator 12.

In one embodiment, a quantity of molten plastic is injected from the nozzle of a conventional injection molding machine to a flow path 14 in a gas injection bushing, generally indicated at 16. The molten plastic flows along a resin flow path into a mold cavity of a mold at an injection pressure. The quantity of molten plastic, i.e. the plastic shot, is less than the quantity of plastic which would ordinarily be required to fill the mold cavity.

Figures 3, 4:
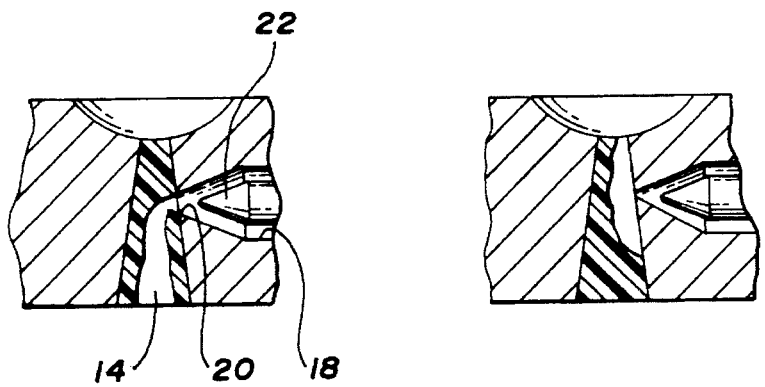
FIG. 3 is a view, partially broken away and in cross-section, of the sprue bushing with molten plastic in the sprue and the valve mechanism in an open position.
FIG. 4 is a view similar to FIG. 3 illustrating the prior art.

The charge of pressurized fluid, preferably nitrogen gas, is communicated from the fluid receiver means 10 during or before the plastic injection, to a gas chamber 18 in selective fluid communication with the mold cavity through an orifice 20 which open from the chamber 18 to the resin flow path. The orifice does not have to have a sufficiently small dimension to resist entry of the relatively viscous molten plastic, as disclosed in U.S. Pat. No. 4,943,407, since the orifice is closed by the tip portion 22 of a valve means or mechanism, generally indicated at 24. The tip portion 22 extends into the sprue area or flow path 14 so that the charge of pressurized gas is introduced through the orifice 20 into the center of the sprue and then down the center of the sprue. This is to be contrasted with the prior art method of FIG. 4 (i.e. as shown in U.S. Pat. No. 4,943,407) where gas pushes the sprue sideways and then the gas finds its way into the molded sprue.

Then, the pressurized gas is contained under pressure within the mold, until the article has set up in the mold cavity. During the formation of hollow plastic articles, the pressurized gas exerts outward pressure which forces the plastic to conform to the detail of the mold surface and exhibit fine detail with minimal sink marks or other surface defects. Preferably, a relatively low holding pressure is maintained in the mold to prevent a turbulent venting of the gas to ambient.

Finally, the gas is vented from the mold to ambient or to a gas holding tank for reuse prior to opening the mold and removing the finished molded article.

Description Of The System

As previously mentioned, pressurized gas is stored in the gas or air pressure receiver 10 which preferably has a 14,000 psi capacity.

The pressure of the gas from the pressure receiver 10 can be reduced or regulated to the proper pressure needed by the injection molding process by the pressure regulator 12. The regulator 12 reduces the 14,000 psi to a value needed for the article or molding i.e. 1,000 psi to 8,000 psi and, preferably, 2,500 to 3,500 psi depending on the plastic used for the article.

A charge of pressurized gas needed for the injection molding process is transferred or communicated to the chamber 18 when the solenoid of a directional control valve 26 is energized under control of a controller 28 and is open long enough to communicate and direct a charge of gas within the pressure gas receiver 10 through a passage 30 to the chamber 18. Because the tip portion 22 of the valve mechanism 24 blocks the orifice 20, the charge of pressurized gas is stored in the chamber 18 on one side of a piston 32 of the valve mechanism 24.

When a sufficient amount of gas has been communicated from the gas receiver 10, the directional control valve 26 is deenergized.

Prior to the charge of gas being communicated to the chamber 18 on one side of the piston 32, gas is communicated to the opposite side of the piston 32 through a passage 34. This gas comes from the receiver 10 after being reduced or regulated by a gas regulator 36. A directional control valve 38 is energized under control of the controller 28 and is open long enough to communicate an amount of gas on the opposite side of the piston 32 to hold the tip portion 22 in its closed position to store the charge of gas in the chamber 18.

When the stored charge of gas is to be introduced into the mold cavity, the solenoid of a directional control valve 40 is energized also under control of the controller 28 and is open long enough to vent the gas on the opposite side of the piston 32 through the passage 34 and to atmospheric pressure.

A gas directional valve 42 under control of the controller 28 allows gas in the article to flow to a pressure reducing valve or pressure regulator 44 to allow a low holding pressure in the molding i.e. just enough pressure to complete the molding and hold the thick sections from sinking.

A manual throttle valve 46 controls the rate of gas coming out of the molding. This eliminates fast turbulent venting of the gas from the molding or article.

After the fluid has been contained under pressure to allow the article to set up in the mold cavity, the fluid is vented to ambient or to a reservoir or tank by energizing a directional control valve 48 to open the valve 48. The gas from the mold may be controlled at a metered rate by a manual gas throttle valve (not shown) so that the gas pressure doesn't go down to atmospheric pressure too fast. Thereafter, the directional control valve 48 is closed and the completed article is ejected from the mold.

Alternatively, the fluid may be vented to ambient by separating the mold and the injection nozzle (not shown) after the molten resin has cooled beneath its softening point.

Figure 1:
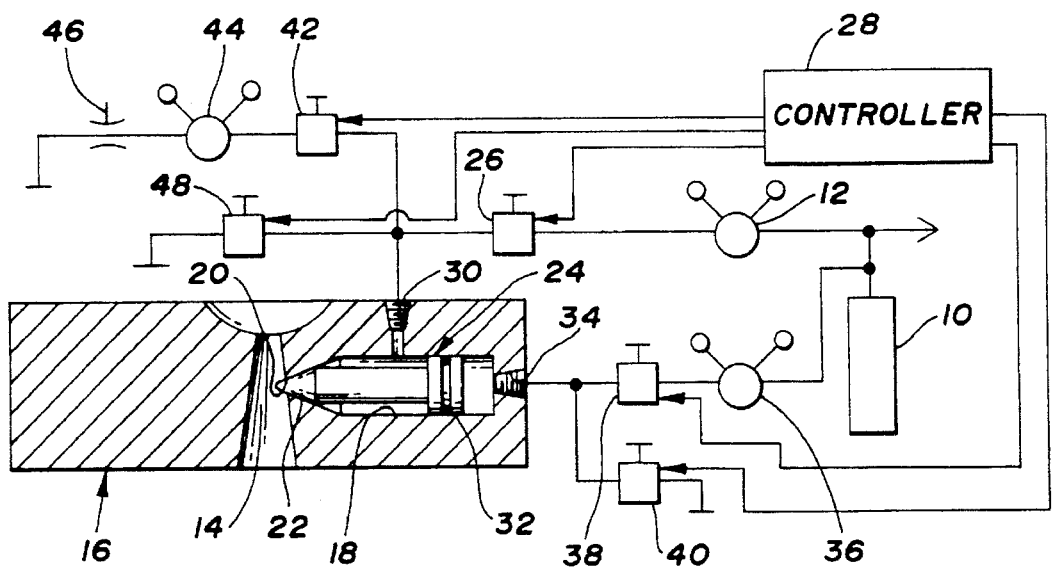
FIG. 1 is a general schematic view of a system constructed in accordance with the present invention.
Figure 2:
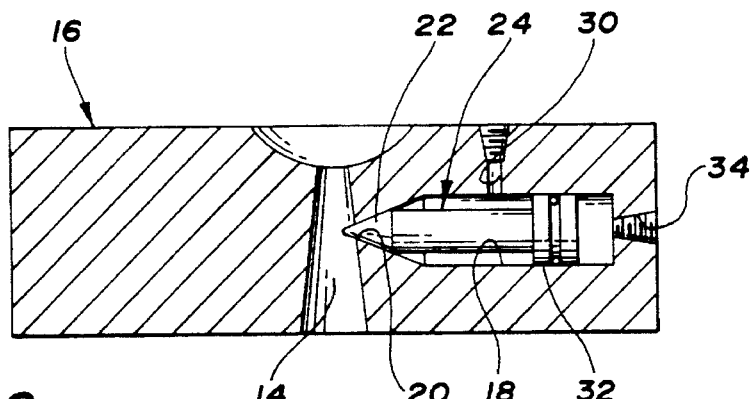
FIG. 2 is an enlarged sectional view of a sprue bushing having a valve mechanism disposed therein in a closed position.

Sequence of Operations (1) Energize the valve 38, gas goes to the opposite side of the piston 32 closing the valve mechanism into the position shown in FIGS. 1 and 2.

(2) Inject plastic into resin injection aperture and into mold cavity.

(3) Any time during or before or after #2 step, energize valve 26 allowing gas at pressure setting of regulator 12 to enter the chamber 18. The valve mechanism 24 will not move as the area difference between opposites sides of the piston 32 will keep the tip portion 22 of the valve mechanism 24 closed even if the pressure of the regulator is a fraction of the pressure of regulator 12. However, the pressure of the regulator 36 must be high enough to overcome the pressure of the regulator 12.

(4) Once in the chamber 18, the gas pressure to inject is closer to the molding then shown by the prior art and at a moment's notice ready to inject into the molding with little if any gas pressure loss. Typically, it takes only 0.02 cubic centimeters of gas to move the valve mechanism 24.

(5) Based on a signal, i.e. timer—position, etc., the controller 28 energizes the valve 40 and deenergizes the valve 38; the gas on the opposite side of the piston 32 goes to atmosphere, allowing the gas from the chamber 18 to at once move the tip portion 22 to its open position. This allows gas to enter the sprue area 14 at once and flow into the molding.

(6) After the molding is filled out, the valve 26 is deenergized, the valve 42 is energized and the gas is thereby vented to a lower molding pressure. Alternately, the pressure of the gas is dropped as soon as the gas breaks through into the molding.

(7) After the molding is self-supporting, the valve 42 is deenergized and the valve 48 is energized which will vent the molding to atmospheric pressure.

(8) After the molding has gone to atmospheric pressure, the valve 38 is energized and the valve 40 is deenergized to close the valve mechanism 24. The system is then ready for the next shot of plastic.

The above-noted procedure makes the gas ready close to the molding with little or no pressure drop as it flows into the molding and, therefore, there is no need to repressurize.

Figure 5:
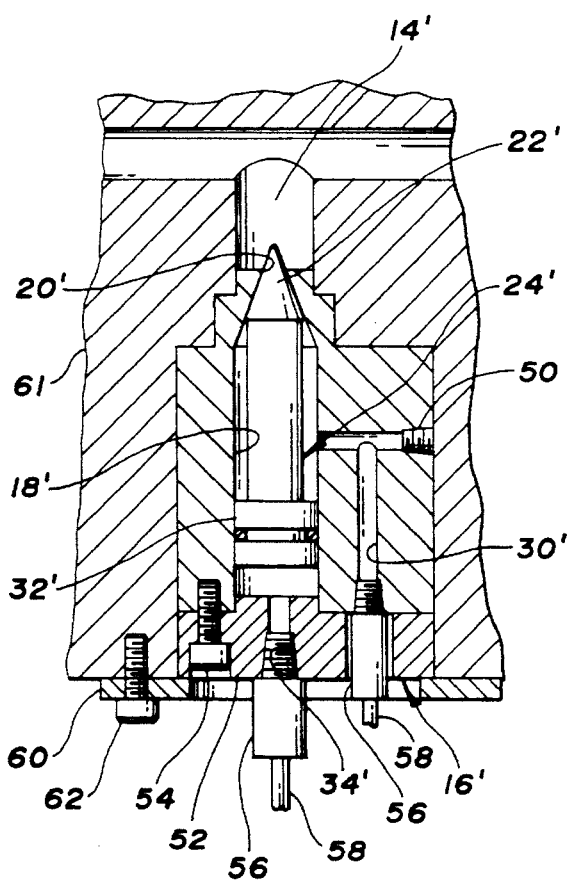
FIG. 5 is a view, partially broken away and in cross-section, wherein the sprue bushing of FIGS. 1–3 has been modified for placement adjacent the mold cavity or a runner system of the mold.
Figure 6:
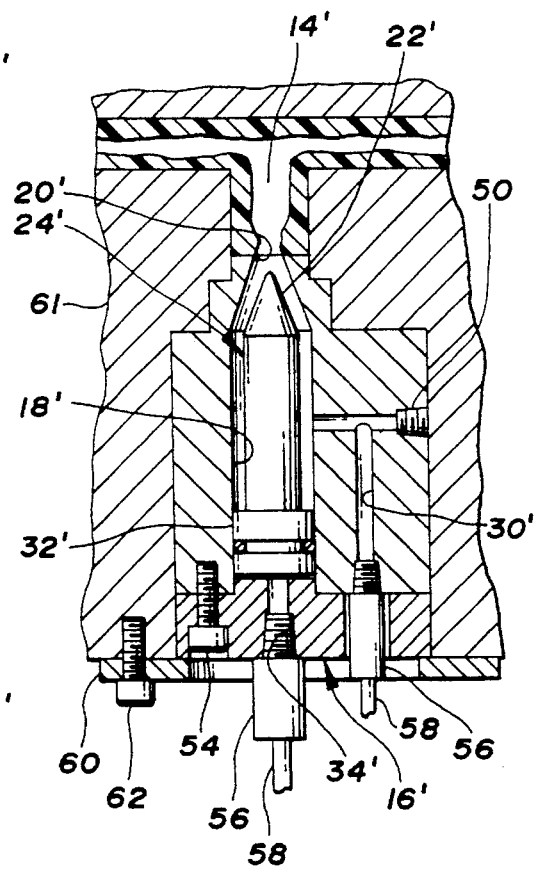
FIG. 6 is a view of the modified sprue bushing of FIG. 5 with its valve mechanism in an open position to allow the charge of pressurized gas to flow into a cavity in the mold.
Figure 7:
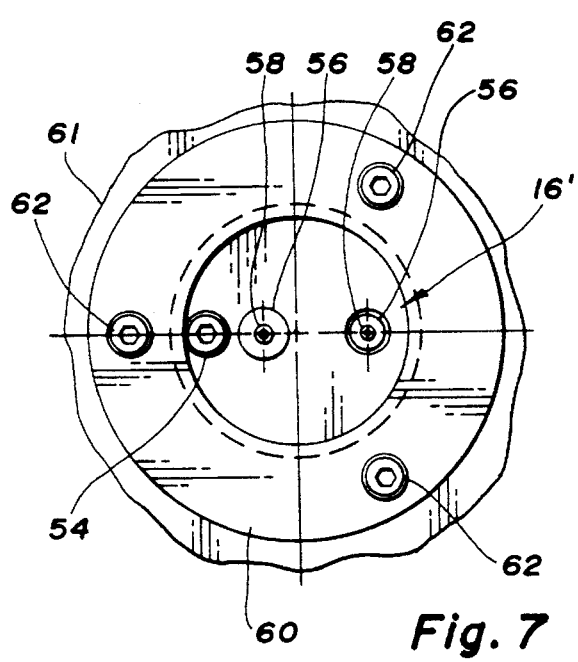
FIG. 7 is an end view, partially broken away, of the modified sprue bushing of FIGS. 5 and 6.

Referring now to FIGS. 5 through 7, there is illustrated a modified gas injection bushing, generally indicated at 16', which may be located adjacent the mold cavity or the runner system in the mold or article (i.e. molding). Parts which have the same or similar function to the parts previously described have a prime designation.

The passageway 30' is closed at one location by a plug or weld 50.

A plate 52 of the modified bushing 16' is secured to the rest of the gas injection bushing 16' by a bolt 54.

Gas fittings 56 and gas pipes 58 are provided to communicate gas to passages 30' and 34' as described with reference to the first embodiment.

A cover plate 60 secures the plate 52 to the mold 61 by means of bolts 62.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. In an injection molding system for injection molding plastic articles, the improvement comprising:

an injection molding machine for injecting molten plastic;

a mold having a resin injection aperture, a mold cavity for receiving molten plastic, and a resin flow path fluidly communicating the injection aperture and the mold cavity with the mold, a chamber and an orifice opening from the chamber to the flow path;

fluid receiver means for storing a charge of pressurized fluid;

fluid circuit means interconnecting the fluid receiver means to the chamber for selectively introducing the charge of pressurized fluid into the chamber;

a valve mechanism having a piston with a tip portion, the piston being disposed within the chamber and being slidable therewithin between a closed position, wherein the tip portion extends partially through and seals the orifice, and an open position, wherein the tip portion is retracted from the orifice and pressurized fluid from the chamber is allowed to flow through the orifice into the flow path; and control means connected to said valve mechanism initially to apply pressurized fluid from the fluid receiver means to force the piston into said closed position and to store the charge of pressurized fluid in the chamber and then to allow the piston to return to said open position under influence of the charge of pressurized fluid in the chamber, allowing the charge of pressurized fluid to flow from the chamber, through the orifice and into the flow path after the molten plastic has been injected into the mold.

2. The system of claim 1 wherein the control means further includes means for reducing, and holding at a minimum, fluid pressure of said fluid after said fluid has initially been injected into molten plastic within the mold cavity, the minimum pressure preventing the molded plastic from sinking before said plastic hardens.

3. The system of claim 2 wherein the control means further includes means for venting to ambient air the fluid held within the molded plastic article after the article hardens.

4. The system of claim 1 wherein at least part of the fluid circuit means is contained within the mold.

5. The system of claim 4 wherein the mold includes a sprue, the sprue having the injection aperture and wherein the fluid circuit means is contained within the sprue.

6. The system of claim 5 wherein the sprue includes a bushing having the orifice and wherein the injection nozzle communicates with the bushing and the pressurized fluid is communicated to the orifice in the bushing.

7. The system of claim 1, wherein the tip portion extends through the orifice and into the flow path when the piston is in said closed position, the tip portion forming a depression in the molten plastic so that pressurized fluid is introduced into the center of the flow path when the piston is in said open position.

8. The system of claim 1, further including means for venting the fluid that initially forced the piston into closed position.

9. The system of claim 2, further including means for controlling the rate of fluid discharge from within the molded plastic article as the pressure of the fluid within the molded plastic article is being reduced.

10. An injection molding system for injection molding plastic articles a mold having an injection aperture and a mold cavity for receiving molten resin, the injection molding system comprising:

means for injecting a quantity of molten plastic through the injection aperture and into the mold cavity, a resin flow path fluidly communicating the injection aperture and the mold cavity within the mold;

means for communicating a charge of pressurized fluid from a source of pressurized fluid to a chamber within the mold, an orifice opening from the chamber to the resin flow path;

means for blocking the orifice so that the charge of pressurized fluid is stored within the chamber;

means for unblocking the orifice so that the stored charge of pressurized fluid is introduced into the resin flow path from the orifice;

means for containing the fluid under pressure within the mold until the article is set up and formed in the mold cavity; and means for venting the fluid from the mold wherein the mold includes valve means and wherein the means for blocking includes means for applying a control pressure to the valve means to block the orifice, the stored charge of pressurized fluid causing the valve means to unblock the orifice upon relieving the control pressure.

11. The system of claim 10 wherein the valve means includes a piston and a tip portion operatively associated with the piston to move therewith within the chamber, the tip portion having a closed position and an open position to introduce the charge of pressurized fluid from the chamber, through the orifice and into the resin flow path, the means for applying a control pressure to the valve means applying the control pressure to the piston to cause the tip portion to move to said closed position, the piston being under pressure from the stored charge of pressurized fluid causing the tip portion to move to said open position to unblock the orifice upon relieving the control pressure.

12. The system of claim 11 wherein the tip portion, in said closed position, extends through the orifice and into the resin flow path.

13. The system of claim 11 wherein the piston is mounted for reciprocating movement within the chamber.

14. The system of claim 11 wherein the fluid is vented from the article through the same orifice as that through which said fluid was introduced.

* * * * *